United States Patent [19]

Annee et al.

[11] Patent Number: 5,420,591
[45] Date of Patent: May 30, 1995

[54] METHOD FOR THE DISCRIMINATING OF OBSTACLES BY MEANS OF RADAR, AND APPLICATIONS

[75] Inventors: Gilbert Annee, Plouzane; Patrick Garrec, Locamaria Plouzane; Pascal Cornic, St Renan, all of France

[73] Assignee: Thomson CSF, Courbevoie Cedex, France

[21] Appl. No.: 78,393

[22] Filed: Jun. 16, 1993

[30] Foreign Application Priority Data

Jun. 19, 1992 [FR] France ............................ 92 07480

[51] Int. Cl.⁶ ............................................. G01S 13/46
[52] U.S. Cl. ..................................... 342/188; 342/124; 342/129
[58] Field of Search ............... 342/188, 129, 124, 112, 342/159, 379

[56] References Cited

U.S. PATENT DOCUMENTS

| | | | |
|---|---|---|---|
| 3,781,889 | 12/1973 | Mitchell | 342/379 |
| 3,945,005 | 3/1976 | Dunn. | |
| 4,107,678 | 8/1978 | Powell. | |
| 4,231,037 | 10/1980 | Long | 342/159 |
| 4,660,044 | 4/1987 | Lavelle. | |

FOREIGN PATENT DOCUMENTS

| | | |
|---|---|---|
| 0042730 | 12/1981 | European Pat. Off. . |
| 0371346 | 11/1989 | European Pat. Off. . |
| 3210400 | 1/1989 | Germany . |
| 4028603 | 3/1992 | Germany . |
| 8403942 | 10/1984 | WIPO . |

OTHER PUBLICATIONS

Stammler et al., "Radar Signal Processing for Traffic Control", Proc. of Eusipco-88 4th European Signal Proc. Conf., vol. 2, 8 Sep. 1988, France, pp. 791–794.

*Primary Examiner*—Gilberto Barron, Jr.
*Attorney, Agent, or Firm*—Meltzer, Lippe, Goldstein

[57] ABSTRACT

Disclosed is a method for the discriminating of obstacles by means of a radar, and its different applications to the measurement of a liquid in a tank or vessel, or again to the elimination of unwanted or parasitic echos coming notably from the ground, for radars mounted on vehicles or controlling vehicle traffic. To implement the method, the obstacle to be discriminated must have a substantially plane surface. The disclosed method then consists in successively transmitting substantially plane waves at slightly different angular frequencies $\omega_i$, each wave being furthermore sent with two different polarizations p and p' chosen in such a way that these different coefficients of reflection on the obstacles according to the incidence of the waves give a criterion of discrimination. The processing at reception depends on the use (measurement of distance, elimination of parasitic echos etc.). The main promising feature of the invention lies in the fact that it is possible to make very precise measurements without placing excessive constraints on the transmission pattern of the radar.

12 Claims, 4 Drawing Sheets

METHOD FOR THE DISCRIMINATING OF OBSTACLES BY MEANS OF RADAR, AND APPLICATIONS

BACKGROUND OF THE INVENTION

The present invention relates to a method for the discriminating of obstacles by means of a radar, and its different applications to the measurement of a liquid in a tank or vessel, or again to the elimination of unwanted or parasitic echos coming notably from the ground, for radars mounted on vehicles or controlling vehicle traffic.

The proposed method meets different constraints or limitations encountered in the above-mentioned fields of application in which precise measurements have to be made, either of distance or of Doppler frequencies, in order to compute speeds. Now, the precision of the measurements made by radar depends firstly on the inherent characteristics of the radar used (waveform, width of the major transmission lobe, frequency band used, level of the secondary lobes etc.) and secondly on the different surrounding obstacles which may constitute parasitic echos for the radar and may thus disturb the measurements.

In the particular application pertaining to the measurement of the level of a liquid contained in a tank, for example a tank of a petrol tanker, it is sought to make as precise a measurement of the level as possible in order to reliably determine the total quantity of liquid contained in the tank. The approaches that are habitually proposed consist in the use of a continuous wave radar, of the FM/CW (i.e. frequency modulated, continuous wave) type working in X band, the radar being placed above the tank and being aimed vertically at the surface constituted by the liquid. The receiver of the radar then carries out the spectral analysis of the signals received after mixing with the transmission signal, according to the known principle of the correlation radar. The drawbacks of these approaches are numerous: the beam of the radar needs to be sized so as to intercept only the surface of the liquid in the tank when the level is at its lowest, without illuminating the edges of the tank, which send back parasitic echos, thus dictating a very low level of secondary lobes. Furthermore, since the resolution in distance of a correlation radar is inversely proportional to the frequency band $\Delta F$ used, this frequency band should be big enough, typically of the order of 1 GHz if precision of the order of one centimeter is desired. This leads to major requirements relating to the linearity of the transceiver in the frequency band $\Delta F$ used. Finally, the spectral analysis done may necessitate the use of 1024-point FFT. All these requirements make the radar costly.

In the other applications relating to radars mounted on vehicles for the measurement, for example, of their speed of movement by Doppler effect, or else to radars designed for the control of vehicle traffic, for example on the road, the measurements made are inconveniently disturbed by parasitic echos that come notably from the ground and are received by the minor lobes. This problem is generally resolved, but inadequately so, by placing major constraints on the minor lobes.

The present invention is aimed at overcoming the above drawbacks and limitations by proposing a method for the discriminating of obstacles that can be used to reduce the costs of the radar and increase the precision of the measurements, irrespectively of the measurements made (distance, Doppler, etc.).

SUMMARY OF THE INVENTION

More specifically, the invention relates to a method for discriminating an obstacle among a number M of obstacles, this obstacle having a substantially plane surface, wherein said method consists in successively transmitting, from a radar, a number N greater than 2 of substantially plane waves at distinct angular frequencies $\omega_i$, the whole number i varying from 1 to N, the N angular frequencies $\omega_i$ being chosen so as to be slightly different in a frequency band $\Delta F$ that is narrow enough for the reflection coefficients obtained on a same obstacle for different angular frequencies to be the same, whatever may be the angular frequency, and wherein each wave at a given angular frequency $\omega_i$ is furthermore sent with two distinct polarizations p and p' chosen in such a way that only the reflection coefficients obtained for each of the polarizations on the surface of the obstacle to be discriminated, for waves at a given angular frequency reaching said surface at a normal angle of incidence, are equal, the polarizations making it thus possible to achieve a discrimination of the obstacle.

Should the obstacles other than the surface constitute parasitic obstacles (the case of the measurement of the level of a liquid in a tank for example), the direction of aim of the radar is orthogonal to the surface and the method according to the invention provides for a step to compute the distance $d_A$ between the radar and the surface.

In the other applications referred to here above, it is the plane obstacle constituted by the surface that is a source of difficulty and the method according to the invention then provides for a step for the elimination of the parasitic echos coming from this surface.

An object of the invention is also an application of the method of the invention to the measurement of the level of a liquid in relation to a given reference level on which the radar is positioned, wherein the radar has:
  first means to send the waves successively at the angular frequencies $\omega_i$, each wave at a given angular frequency $\omega_i$ being sent with the two polarizations p and p';
  second means to compute the distance $d_A$ between the radar and the level of the liquid constituting the surface.

A third object of the invention is an application of the method according to the invention to the elimination of parasitic echos received by a Doppler speed-counter or road-traffic radar that is placed on a road vehicle with its major lobe inclined with respect to the vertical, wherein the radar has:
  means to successively send the waves at the angular frequencies $\omega_i$, each wave at a given angular frequency $\omega_i$ being sent with the two polarizations p and p';
  means to eliminate the parasitic echos coming from the ground.

BRIEF DESCRIPTION OF THE DRAWINGS

The invention as well as its advantages will be understood more clearly from the following description, made with reference to the appended figures.

MORE DETAILED DESCRIPTION

Figure 1:
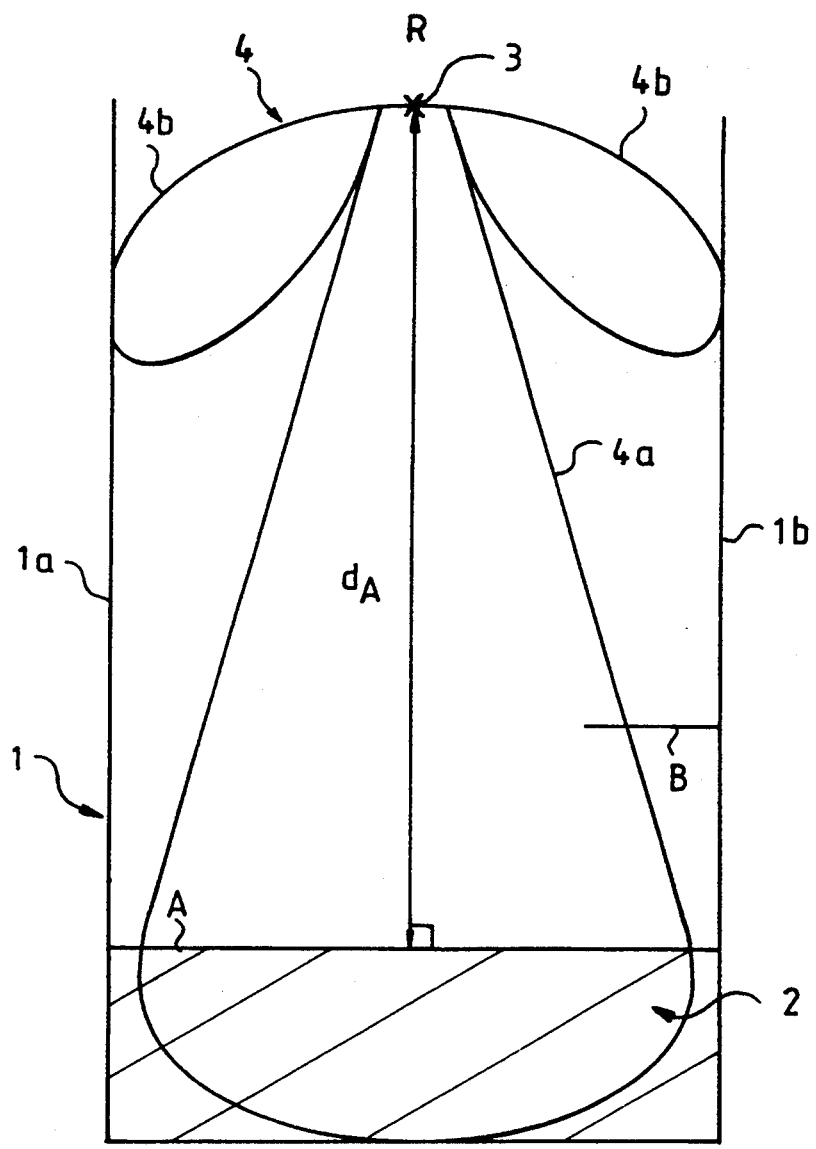
FIG. 1 illustrates the method according to the invention applied to the measurement of the level of a liquid in a tank.

For a clearer understanding of the invention, we shall take an example within the non-restrictive framework of FIG. 1 which corresponds to the application of the method according to the invention to the measurement of the level of a liquid in a tank.

This FIG. 1 shows a tank 1 containing a liquid 2. The surface of the liquid 2 constitutes a substantially plane surface obstacle that shall be referenced A. On one of its vertical walls 1a or 1b, the tank also has a second obstacle B located above the obstacle A. In a known way, the measurement of the level of liquid is done by means of a radar 3 placed above the tank 1 at the point R. The radar 3 has a transmission pattern 4 having a major lobe 4a, the aiming direction of which is perpendicular to the surface of the obstacle A, and minor lobes 4b. The obstacle B, as shown, constitutes a parasitic obstacle that gives rise to major problems for the measurement of the distance $d_A$ between the radar 3 and the obstacle A, since it intercepts the major lobe 4a. The parts of the walls 1a and 1b that intercept the minor lobes 4b also constitute troublesome parasitic obstacles. In the computation that shall be performed hereinafter, it shall be considered, to simplify matters, that it is sought to discriminate only the obstacles A and B. This computation shows that it is possible to discriminate these two obstacles A and B according to the method of the invention, by the successive transmission, from the radar 3, of at least three substantially plane waves at three slightly different angular frequencies $\omega_i$ chosen from a relatively narrow frequency band $\Delta F$, each wave at a given angular frequency $\omega_i$ being sent with two different polarizations p and p', the characteristics of which shall be given hereinafter.

The signals sent by the radar 3 according to the invention have the form:

$$\begin{cases} x_{ip}(t) = x_0 e^{j\omega_i t} & \text{for an angular frequency } \omega_i \\ & \text{according to the polarization } p \\ x_{ip'}(t) = x_0 e^{j\omega_i t} & \text{for an angular frequency } \omega_i \\ & \text{according to the polarization } p' \end{cases}$$

with the whole number i varying from 1 to 3 and the angular frequencies $\omega_i$ preferably such that for any i varying from 1 to 3

$$\omega_{i+1} - \omega_i = \Delta\omega$$

The step of computation of the distance $d_A$ according to the invention consists in carrying out, first of all, a demodulation of the signals $r_{ip}(t)$ and $r_{ip'}(t)$ received by the radar in response respectively to the transmitted signals $x_{ip}(t)$ and $x_{ip'}(t)$ so as to obtain signals $Y_{ip}$ and $Y_{ip'}$ with the form:

$$\begin{cases} Y_{ip} = A_{ip} x_0 e^{j\omega_i \tau_A} + B_{ip} x_0 e^{j\omega_i \tau_B} \\ Y_{ip'} = A_{ip'} x_0 e^{j\omega_i \tau_A} + B_{ip'} x_0 e^{j\omega_i \tau_B} \end{cases} \quad (1)$$

where:

$A_{ip}$ (respectively $B_{ip}$) is the coefficient of reflection of a wave at an angular frequency $\omega_i$ and polarization p on the obstacle A (and B respectively);

$A_{ip'}$ (respectively $B_{ip'}$) is the coefficient of reflection of a wave at an angular frequency $\omega_i$ and polarization p on the obstacle A (and B respectively);

$\tau_A$ and $\tau_B$ are the to-and-fro propagation times of a wave that gets reflected on the respective obstacles A and B.

The system of equations (1) can be simplified by means of the following observations:

the coefficient of reflection of a wave at a given angular frequency may be the same as that of a wave at the same incidence and at another angular frequency, however little the extent to which the two angular frequencies are sufficiently close to each other;

it is possible to choose polarizations p and p' such that, for waves arriving at a normal angle of incidence, i.e. perpendicularly to the plane surface A, the coefficient of reflection on this surface is the same for both these polarizations. Since the other obstacles are not illuminated according to the same incidence as the surface, the coefficient of reflection on these obstacles will, for its part, be different for these two polarizations. To meet these conditions, the polarizations are chosen so as to be preferably orthogonal.

The foregoing two observations are expressed by the following equations:

$$\forall i \in [1,3], A_{ip} = A_{ip'} = A$$

$$B_{ip} = B_p$$

$$B_{ip'} = B_{p'}$$

This enables the system of equations (1) to be simplified as follows:

$$\begin{cases} Y_{1p} = Ax_0 e^{j\omega_1 \tau_A} + B_p x_0 e^{j\omega_1 \tau_B} \\ Y_{1p'} = Ax_0 e^{j\omega_1 \tau_A} + B_{p'} x_0 e^{j\omega_1 \tau_B} \\ Y_{2p} = Ax_0 e^{j\omega_2 \tau_A} + B_p x_0 e^{j\omega_2 \tau_B} \\ Y_{2p'} = Ax_0 e^{j\omega_2 \tau_A} + B_{p'} x_0 e^{j\omega_2 \tau_B} \\ Y_{3p} = Ax_0 e^{j\omega_3 \tau_A} + B_p x_0 e^{j\omega_3 \tau_B} \\ Y_{3p'} = Ax_0 e^{j\omega_3 \tau_A} + B_{p'} x_0 e^{j\omega_3 \tau_B} \end{cases}$$

There are different possible combinations of these six equations, enabling the computation of $\tau_A$. It is possible, for example to form the ratio $$k = \frac{Y_{2p} - Y_{2p'}}{Y_{1p} - Y_{1p'}} = e^{j\Delta\omega \tau_B}$$

then the ratio $$k' = \frac{kY_{2p} - Y_{3p}}{kY_{1p} - Y_{2p}} = e^{j\Delta\omega\tau_A}$$

Having the value $\tau_A$, it is possible to deduce therefrom the distance $d_A$ sought by the relationship:

$$d_A = \frac{\tau_A C}{2}$$

It may be observed that, by this method, it is possible to compute not only the distance $d_A$ which is sought here but also the distance between the radar 3 and the parasitic obstacle B.

It is easy to extend the above computation to that of discrimination between a surface A and (M−1) other obstacles. The method according to the invention indeed provides, in this case, for the transmission successively of a number N of substantially plane waves at different angular frequencies $\omega_i$, each wave at a given angular frequency $\omega_i$ being further sent according to two different polarizations p and p′ that are chosen to meet the conditions given here above, namely:

identical coefficients of reflection for two waves at the same angular frequency $\omega_i$, arriving at the surface at a normal angle of incidence, one being sent with the polarization p and the other with the polarization p′;

different coefficients of reflection for the other obstacles.

The signals received by the radar, after phase detection or standard demodulation, are then of the following type:

$$\begin{cases} Y_{ip} = Ae^{j\omega_i\tau_A} + \sum_{j=1}^{M-1} B_{ijp}e^{j\omega_i\tau_j} \\ Y_{ip'} = Ae^{j\omega_i\tau_A} + \sum_{j=1}^{M-1} B_{ijp'}e^{j\omega_i\tau_j} \end{cases}$$

with:

A, coefficient of reflection of the waves on the surface;

$\tau_j$, to-and-fro propagation time of waves getting reflected on an obstacle j different from the surface, j being a whole number varying from 1 to M−1;

$B_{ijp}$ and $B_{ijp'}$, the coefficients of reflection on the obstacle j of the waves having an angular frequency $\omega_i$ and respective polarizations p and p′;

equations that can again be written in the form:

$$\forall i \in [1, N] \begin{cases} Y_{ip} = Ax_0e^{j\omega_i\tau_A} + B_{ip}e^{j\alpha_{ip}} \\ Y_{ip'} = Ax_0e^{j\omega_i\tau_A} + B_{ip'}e^{j\alpha_{ip'}} \end{cases}$$

where $B_{ip'}$ and $B_{ip}$ are real coefficients that are independent of each other, and $\alpha_{ip'}$ and $\alpha_{ip}$ represent phases that are also independent of each other.

There is no longer any analytical solution once more than two obstacles are considered. It is then necessary to use iterative methods of digital computation or an estimation of $\tau_A$ done as follows:

By computing the sum to infinity of the coefficients of interconnection between two signals $Y_{ip}$ and $Y_{(i+1)p'}$, at two successive angular frequencies $\omega_i$ and $\omega_{i+1}$ and with different polarizations, and in taking account of the property of independence between the coefficients $B_{ip'}$ and $B_{ip}$ on the one hand and the phases $\alpha_{ip}$ and $\alpha_{ip'}$ on the other hand, it is possible to demonstrate the following equality:

$$\lim_{N \to \infty} \left[ \sum_{i=1}^{N} Y_{(i+1)p} Y^*_{ip'} \right] = A(N+1)e^{j\Delta\omega\tau_A}$$

whence it is possible to deduce an estimator of the propagation time $\tau_A$ for N fixed, according to the relationship:

$$\hat{\tau}_A = \frac{1}{\Delta\omega} \arctan \left[ \frac{Im\left(\sum_{i=1}^{N} Y_{(i+1)p}Y^*_{ip'}\right)}{Re\left(\sum_{i=1}^{N} Y_{(i+1)p}Y^*_{ip'}\right)} \right]$$

and an estimation $\hat{d}_A$ of the corresponding distance:

$$\hat{d}_A = \frac{C}{2\Delta\omega}\hat{\tau}_A$$

Figure 2:
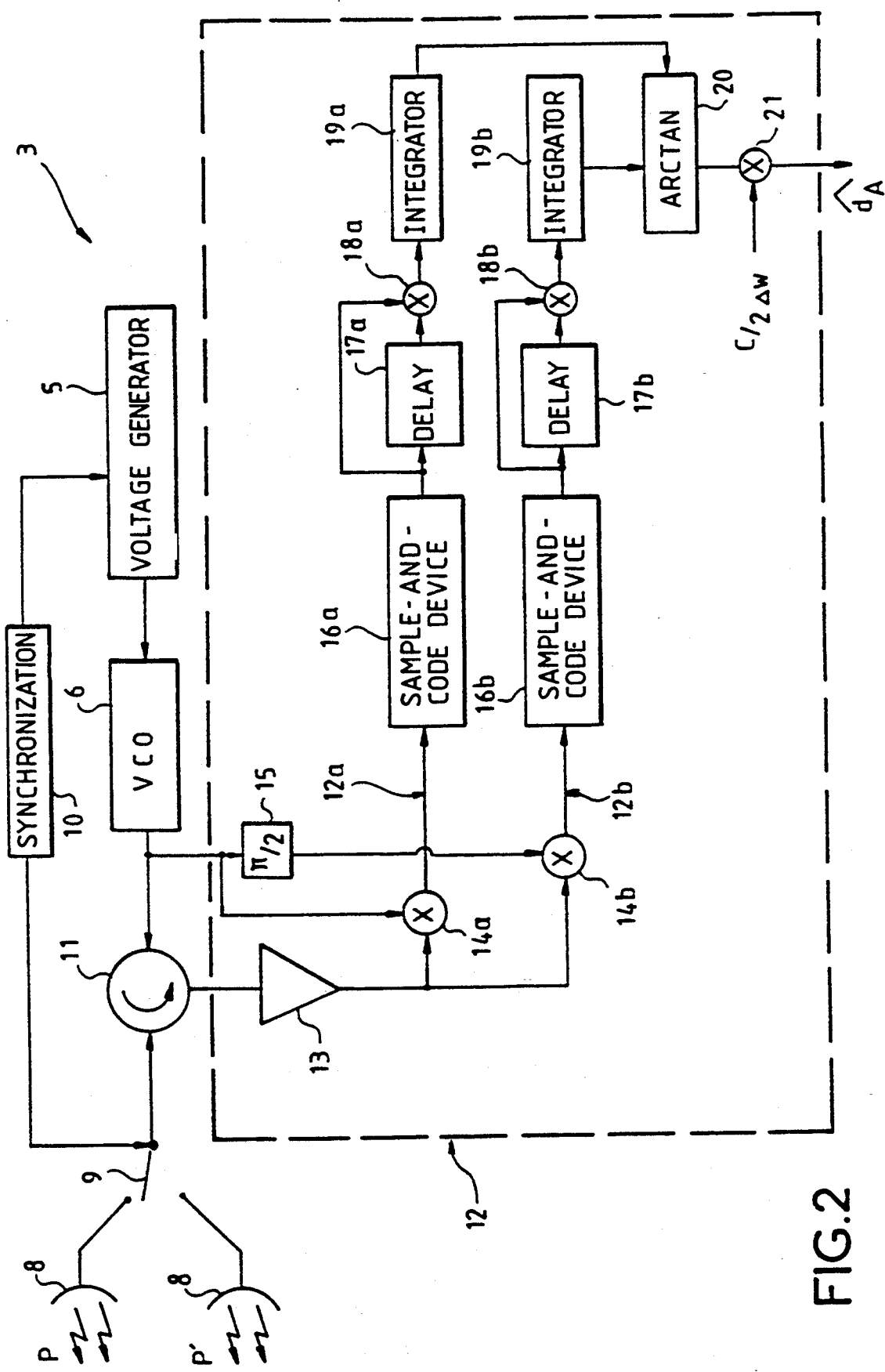
FIG. 2 shows an exemplary embodiment of a radar for the implementation of the above method.

FIG. 2 shows an exemplary embodiment of a radar that can be used to implement the foregoing application and that can be used, more generally, to measure the level of a liquid in relation to a given reference level, on which the radar is positioned.

Figure 5:
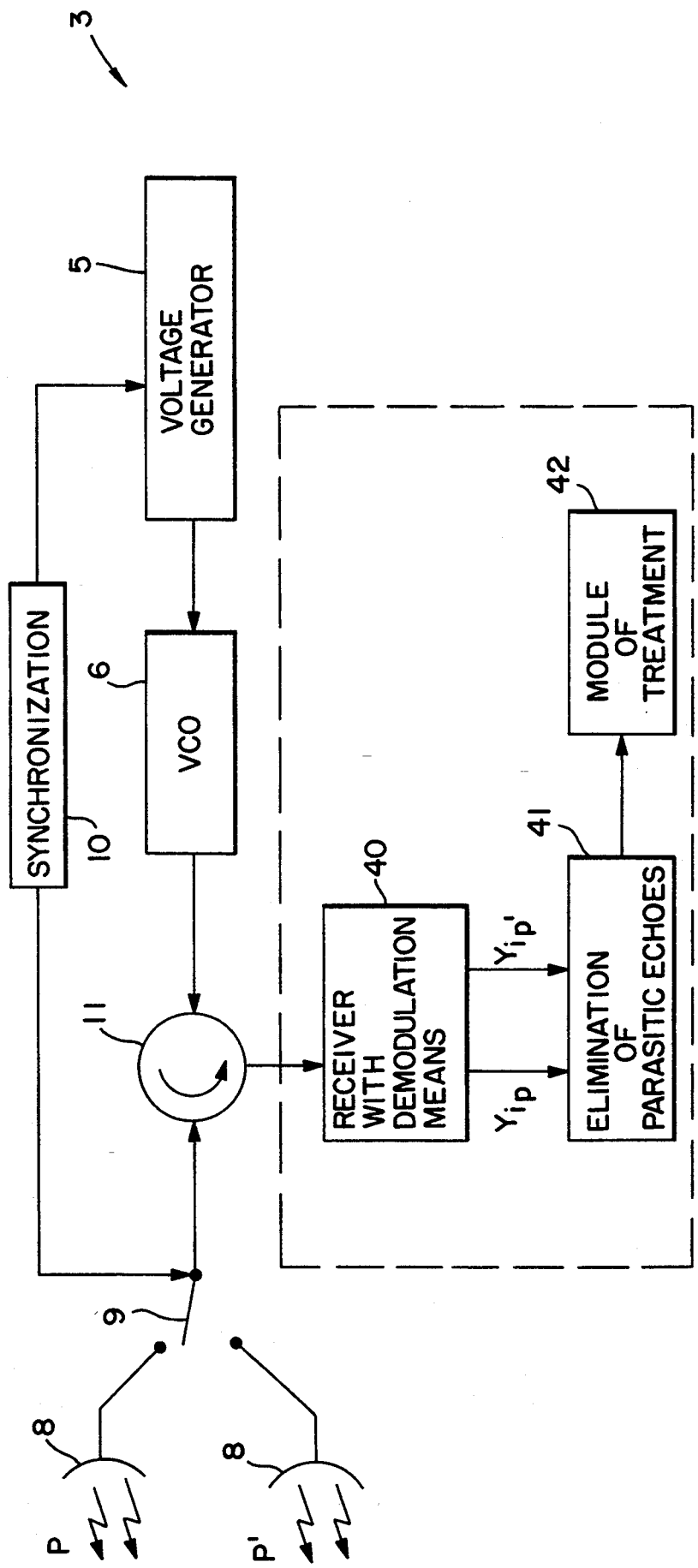
FIG. 5 shows another exemplary embodiment of a radar for the implementation of the method of FIG. 1.

FIG. 5 shows the same elements as FIG. 2 for transmitting successively the waves at the angular frequencies $\omega_i$. Each wave at a given angular frequency is sent with the two polarizations p and p′. At the reception 11, a receiver with demodulation means 40 realizes in a classical way, the demodulation of the signals transmitted by the receiving antenna 8, in order to deliver the demodulated signals $Y_{ip}$ and $Y_{ip'}$. The means for elimination of parasitic echoes 41 calculates the difference between $Y_{ip}$ and $Y_{ip'}$, in order to deliver to the module of treatment 42 a signal which is free of parasitic echoes. The function of the module of treatment 42 depends on the application. For the Doppler speed-counter either placed on the road vehicle with its major lobe inclined to the verticle or fixed above the vehicle, the treatment module 42 extracts the speed of the vehicles.

As has been stated further above, the radar is positioned vertically to the surface of liquid, so that its aiming direction is orthogonal to this surface.

Referring to FIG. 2, the radar has, according to the invention, first means for the successive transmission of the waves at the angular frequencies $\omega_i$ and with two polarizations p and p′, and second means to compute the distance $d_A$ between the radar and the level of the liquid.

In the non-restrictive embodiment shown in FIG. 2, these first transmission means comprise firstly a voltage generator 5 giving a voltage-controlled-oscillator (VCO) 6, N successive values of voltages $V_i$ necessary to obtain the waves at the N angular frequencies $\omega_i$.

Figure 3:
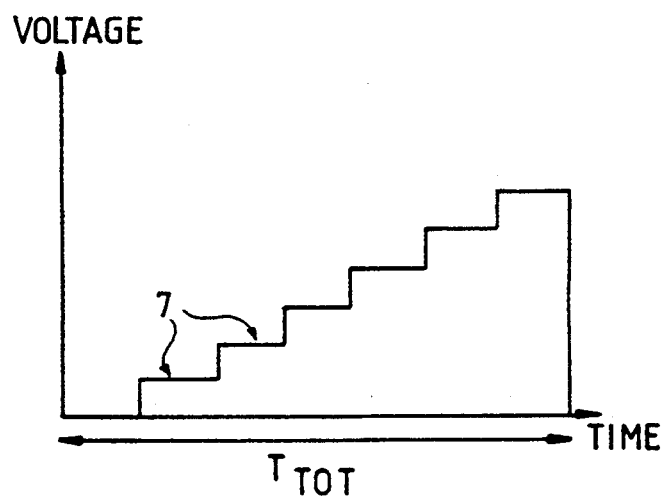
FIG. 3 shows a possible shape of the voltage sent out by the generator of FIG. 2 as a function of time.

The characteristic of a voltage generator such as this may, for example, have the shape of a stairway with preferably constant steps 7 as can be seen in FIG. 3 so as to obtain, on a total duration $T_{TOT}$ of transmission of the radar, increasing angular frequencies $\omega_i$ spaced out at a constant pitch $\Delta\omega$ on a given frequency band $\Delta F$.

Each wave at an angular frequency $\omega_i$ coming from the VCO 6 is then sent with a polarization p and then with a polarization p' by means of two antennas 8, each transmitting according to one of the two polarizations, and a change-over switch 9 controlled by a synchronization device 10 and getting switched over to either of the antennas 8. The synchronization device 10 is adjusted so that there is sufficient time, for a same angular frequency $\omega_i$, to switch over to the two antennas.

The same antennas 8, in their respective polarizations, receive the reflected waves which they successively transmit through a circulator 11 to a reception line 12 which comprises, in a standard way, an amplifier 13 that is preferably a low-noise amplifier, and two channels 12a and 12b for the parallel processing of the waves received. The two processing channels carry out a demodulation, one of which is a phase demodulation while the other is a phase quadrature modulation, through the mixing, by means of the mixers 14a, 14b, of the received waves having the angular frequencies $\omega_i$ with the waves having the same angular frequencies that come directly from from the VCO 6 or that are phase-shifted by $\pi/2$ by a phase-shifter 15. The signals coming from the mixers 14a, 14b will then undergo a similar digital processing in both channels. They will first of all be supplied to sample-and-code devices 16a, 16b delivering samples at a sampling period T chosen to have a sample representing each angular frequency $\omega_i$. Each sample relating to an angular frequency $\omega_i$ is then memorized in registers 17a, 17b for a determined period so as to make it possible to multiply this sample, by means of multipliers 18a, 18b, with a sample having an angular frequency $\omega_{i+1}$ and a different polarization. The results of these multiplications are then given to integrators 19a, 19b carrying out integration operations on the total duration $T_{TOT}$ of transmission of the radar, and delivering respective estimates of $\text{Arcsin} \Delta\omega\tau_A$ and $\text{Arccos} \Delta\omega\tau_A$. A module 20 computes the ratio of these two estimates. All that remains to be done is to multiply this ratio by the known value $C/2\Delta\omega$ by means of a multiplication module 21 to obtain an estimation of the distance $\hat{d}_A$.

It is clear that the above result can be obtained differently. It is possible, for example, to envisage simultaneous transmission with both polarizations and the parallel processing of the signals received with the different polarizations.

Figure 4:
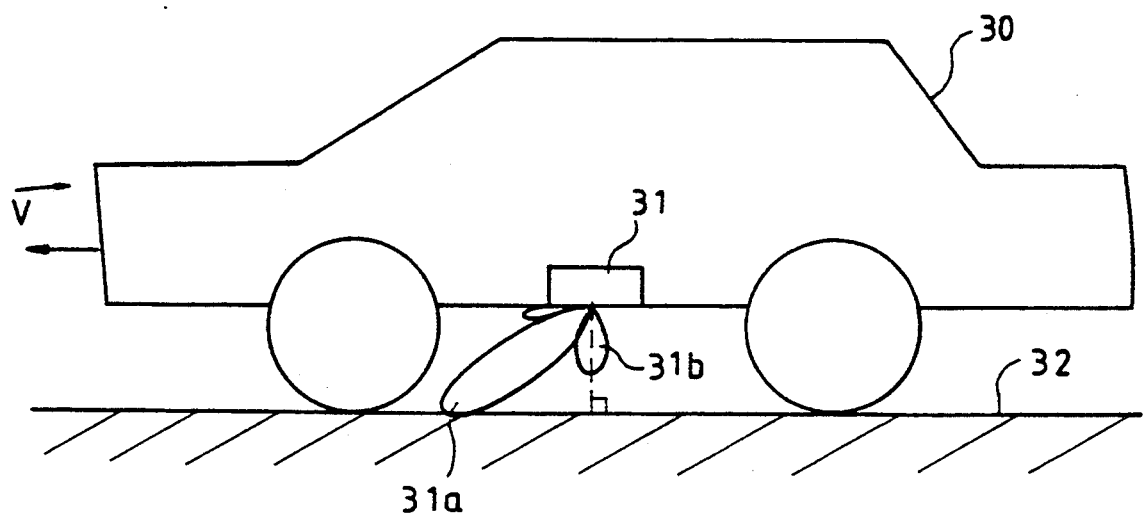
FIG. 4 shows an application of the method of discrimination to the elimination of parasitic echos received by a Doppler speed-counter radar.

FIG. 4 illustrates an application of the method according to the invention to the elimination of parasitic echos coming from a Doppler speed-counter radar.

This figure shows a road vehicle 30 fitted out with a speed-counter radar 31 placed, for example, beneath the chassis of the vehicle 30 in such a way that it major lobe 31a and, consequently, its direction of aim, are inclined with respect to the vertical. The measurement of speed carried out in a known way by this radar 30 is marred by an error coming from the parasitic echo received by the minor lobes 31b at the vertical to the vehicle 30, namely the parasitic echo coming from the ground 32. With the ground having a substantially plane surface locally and, provided that this surface is slightly rough, the echo coming from the vertical is independent of the polarization used so long as the electrical field of the wave remains parallel to the surface of the road. To eliminate this parasitic echo, therefore, the radar has to be fitted out with means for the successive transmission of the waves with a plurality of angular frequencies $\omega_i$, each wave at a given angular frequency $\omega_i$ being sent with two polarizations p and p' in accordance with the method according to the invention, and means for the elimination of the parasitic echos coming from the ground which, for example, take the difference of the two demodulated signals.

Another application of the method according to the invention relates to the elimination of the parasitic echos for a vehicle traffic control radar placed on the road above the traffic, for example under the vault of a tunnel. Here again, the echos that come from the ground or the roofs of the vehicles and that are picked up by the minor lobes are inconvenient for the measurements. The method according to the invention makes it possible to eliminate them as in the above application.

The main promising feature of the invention lies in the fact that it is possible to make measurements of far greater precision without being bound by harsh constraints on the shape of the transmission pattern, notably at the level of the minor lobes. Furthermore it is possible, in the case of a small number of obstacles, to obtain very high precision in distance by using a narrow transmission band. The method of discrimination is also independent of the shape of the waves used, which may be continuous or sent in the form of pulses. However, when it is sought to measure a distance, it is necessary to take necessary precautions so as not to have ambiguities in terms of distance.

In the case of the transmission of continuous waves, the distance will be unambiguous if the difference in phases $(\phi_i+1-\phi_i)$ of two waves sent successively at the angular frequencies $\omega_i$ and $\omega_{i+1}$ is lower than $2\pi$.

In the case of waves sent in the form of pulses, the condition to be met is that the duration of a radar recurrence should be greater in terms of maximum to-and-fro time corresponding to the furthest obstacle for which it is sought to measure the distance.

What is claimed is:

1. A method for discriminating an obstacle among a number M of obstacles, this obstacle having a substantially plane surface, wherein said method comprises successively transmitting, from a radar, a number N greater than 2 of substantially plane waves at distinct angular frequencies $\omega_i$, the whole number i distinct angular frequencies $\omega_i$, the whole number i varying from 1 to N, the N angular frequencies $\omega_i$ being chosen so as to be slightly different in a frequency band $\Delta F$ that is narrow enough for the reflection coefficients obtained on a same obstacle for different angular frequencies to be the same, whatever may be to angular frequency, each wave at a given angular frequency $\omega_i$ being furthermore sent with tow distinct polarization p and p' chosen in such a way that only the reflection coefficients obtained for each of the polarizations on the surface of the obstacle to be discriminated, for waves at a given angular frequency reaching said surface at a normal angle of incidence, are equal, the polarizations making it thus possible to achieve a discrimination of the obstacle, demodulating response signals $r_{ip}(t)$ and $r_{ip'}(t)$ received by the radar and corresponding to the waves sent at the different angular frequencies $\omega_i$ with the respective polarizations p and p' so as to obtain signals $Y_{ip}$ and $Y_{ip'}$ independent of time; and combining the signals $Y_{ip}$ and $Y_{ip'}$ in order to achieve the discrimination.

2. A method of discrimination according to claim 1, wherein said two polarizations p and p' are orthogonal.

3. A method of discrimination according to claim 1 wherein, the radar having a transmission pattern with a major lobe and minor lobes, the waves that reach the surface at a normal angle of incidence are those whose direction of propagation coincides with the direction of aim of the major lobe, and wherein the signals $Y_{ip}$ and $Y_{ip'}$ are combined in order to compute the distance $d_A$ between the radar and the surface.

4. A method of discrimination according to claim 3, wherein the step of computation of the distance $d_A$ comprises, computing the time $\tau_j$ of to-and-fro propagation of waves getting reflected on the surface by the resolving of the following system of 2N equations, obtained by the demodulation:

$$\begin{cases} Y_{ip} = Ae^{j\omega_i \tau_A} + \sum_{j=1}^{M-1} B_{ijp} e^{j\omega_i \tau_j} \\ Y_{ip'} = Ae^{j\omega_i \tau_A} + \sum_{j=1}^{M-1} B_{ijp'} e^{j\omega_i \tau_j} \end{cases}$$

with:

A, coefficient of reflection of the waves on the surface; $\tau_j$, to-and-fro propagation time of the waves getting reflected on an obstacle j different from the surface, j, a whole number varying from 1 to M−1; $B_{ijp}$ and $B_{ijp'}$, the coefficients of reflection on the obstacle j of the waves having and angular frequency $\omega_i$ and respective polarizations p and p'; and deducing the distance $d_A$ therefrom.

5. A method of discrimination according to claim 3, wherein the angular frequencies $\omega_i$ are separated by a constant pitch $\Delta\omega$ and wherein the step of computation of the distance $d_A$ comprises, computing the time $\tau_j$ of to-and-fro propagation of the waves getting reflected on the surface by forming the equation:

$$\hat{\tau}_A = \frac{1}{\Delta\omega} \text{Arctan} \left[ \frac{Im\left(\sum_{i=1}^{N} Y_{(i+1)p} Y^*_{ip'}\right)}{Re\left(\sum_{i=1}^{N} Y_{(i+1)p} Y^*_{ip'}\right)} \right],$$

and deducing an estimate $\hat{d}_A$ of the distance therefrom.

6. A method of discrimination according to claim 1, wherein, the radar having a transmission pattern with a major lobe and minor lobes, the waves that reach the surface at a normal angle of incidence have a direction of propagation different from the direction of the major lobe, thus creating parasitic echoes, and wherein the signals $Y_{ip}$ and $Y_{ip'}$ are combined in order to eliminate said parasitic echoes.

7. A method of discrimination according to claim 6, wherein the step of elimination of the parasitic echoes comprises, forming the difference between the demodulated signals $Y_{ip}$ and $Y_{ip'}$.

8. An application of the method according to claim 3 to the measurement of the level of a liquid in relation to a given reference level on which the radar is positioned, wherein the radar comprises, first means to send the waves successively at the angular frequencies $\omega_i$, each wave at a given angular frequency $\omega_i$ being sent with the two polarizations p and p'; and second means to compute the distance $d_A$ between the radar and the level of the liquid constituting the surface.

9. An application according to claim 8, wherein said first means comprises, a voltage generator giving a voltage-controlled oscillator N successive values of voltage $V_i$ so that the oscillator delivers waves at the N angular frequencies $\omega_i$ for a total period of transmission $T_{ToT}$; and two antennas with respective polarizations p and p' alternately transmitting the waves coming from the oscillator by means of a change-over switch controlled by a synchronization device.

10. An application according to claim 9, wherein said second means comprises a reception line comprising two channels for the parallel processing of the waves received by the radar, one of these channels carrying out a phase demodulation and the other channel carrying out a phase quadrature demodulation, each channel furthermore comprising, in series, a sample-and-code device for delivering samples to a register, a multiplier receiving the samples that come, first of all, from the sample-and-code device and, secondly, from the register, an integrator to integrate the outputs of the multiplier on the total duration of transmission, the outputs for the integrators being then given to a module that takes their ratio, then to a multiplication module carrying out the multiplication of the ratio by $C/2\Delta\omega'$ and delivering an estimate of the distance $d_A$.

11. An application of the method according to claim 6 to the elimination of parasitic echoes received by a Doppler speed-counter radar, said radar being placed on a road vehicle with its major lobe inclined with respect to the vertical, wherein the radar comprises, means to successively send the waves at the angular frequencies $\omega_i$, each wave at a given angular frequency $\omega_i$ being sent with said two polarizations p and p'; and means to eliminate the parasitic echoes coming from the ground.

12. An application of the method according to claim 6 to the elimination of parasitic echoes received by a Doppler speed-counter radar, wherein said radar is fixed above the vehicles, its major lobe being inclined with respect to the vertical, wherein said radar comprises, means to successively send the waves at the angular frequencies $\omega_i$, each wave at a given angular frequency $\omega_i$ being sent with said two polarizations p and p'; and means to eliminate the parasitic echoes coming from the ground.

* * * * *